Figure 1:
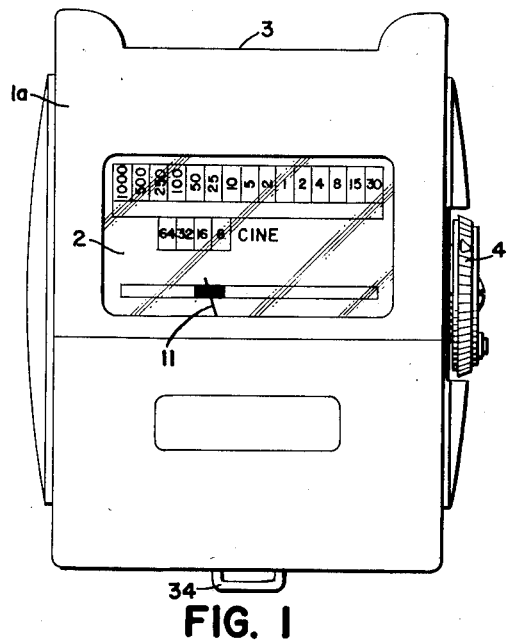

Jan. 11, 1955

H. GOSSEN ET AL 2,699,087

PHOTOELECTRIC EXPOSURE METER

Filed June 2, 1950

2 Sheets-Sheet 1

INVENTOR
HANS GOSSEN, AND
ERWIN PFAFFENBERGER

BY *Young, Emery & Thompson*

ATTORNEYS

Jan. 11, 1955  H. GOSSEN ET AL  2,699,087
PHOTOELECTRIC EXPOSURE METER
Filed June 2, 1950  2 Sheets-Sheet 2

INVENTOR
HANS GOSSEN, AND
ERWIN PFAFFENBERGER

BY Young, Emery & Thompson
ATTORNEYS

United States Patent Office 2,699,087
Patented Jan. 11, 1955

2,699,087

PHOTOELECTRIC EXPOSURE METER

Hans Gossen and Erwin Pfaffenberger, Erlangen, Germany, assignors to P. Gossen & Co. G. m. b. H., Erlangen, Germany, a corporation of Germany Application June 2, 1950, Serial No. 165,627

Claims priority, application Germany December 24, 1949

4 Claims. (Cl. 88—23)

This invention relates to exposure meters and particularly to exposure meters having a photoelectric system for measuring the average brightness of a scene and a mechanism for evaluating the measured scene brightness and the emulsion speed of the film to determine appropriate values of shutter speed and diaphragm opening.

It is an object of the present invention to provide means of correlating the position of a photoelectric light meter's indicating pointer with scales of aperture openings and shutter speed.

A special object of the invention is to facilitate the operation of exposure meters in such a way that the photoelectric measurement and the evaluation of the measured values can be carried out in two separate steps so that the operator need not point the instrument at the scene while evaluating the measured values.

Another object of the invention is to facilitate adjustment of the instrument for the proper speed of the photographic material.

A still further object of the invention is to convert non-proportional or discontinuous deflections of the pointer of a photoelectric exposure meter into proportional or continuous rotary stepwise motions of a rotary roller bearing indicia marks corresponding to the measured values. For various reasons, the deflections of the pointer of a photoelectric exposure meter are not proportional to the magnitude of the light sensed. This is because the current of the photoelectric cell is not proportional to the magnitude of the light sensed, and because the measuring system likewise does not give a proportional indication. In fact, in most instances it is not even desirable to obtain such proportional deflection of the pointer, but in order to obtain a large measuring range, the deflections per unit of change of brightness should be larger in the medium part of the range than at the ends thereof. The readings, on the other hand, must proceed in proportional or at least continuous steps in spite of discontinuous deflections of the pointer and the indicator mechanism is intended to perform the necessary conversions.

With these and further objects in view, according to the present invention the exposure meter is provided with an evaluating mechanism including two parallel rotary rollers or rolls which are positively interconnected by gear means for common rotation by an operating knob, one of said rollers extending across the range of movement of the pointer of the measuring instrument and having on its superficies one series of staggered marks, or two differently colored series of staggered marks adapted to be successively exhibited in the respective view slot in such a way that only one of the marks when exhibited in the view slot will coincide with the actual position of the pointer while the other roller bears a plurality of axially directed rows of first setting values for the camera, for instance, aperture numbers, adapted to be successively exhibited in the respective view slot and being related to at least one stationary row of figures representing corresponding second setting values for the camera, for instance exposure times, or in case of cinematographic cameras, film speeds (frames per second), provided along at least one of the longitudinal edges of the respective view slot. Thus it is possible at first to adjust the rollers so as to exhibit the mark corresponding to the position of the pointer and then to select the suitable pair of aperture numbers and exposure times opposed to each other after such adjustment.

Where it is required to subdivide the measuring range of the instrument, there may be provided two visibly distinguished, for instance differently colored series of staggered marks and means for automatically changing the measuring range of the measuring instrument, for instance by connection of a shunt resistance across the photoelectric cell, according as one of the marks of the first row or one of the marks of the second row is exhibited.

Furthermore, the operating knob may be provided with setting means, whereby the gear means on the shaft of the first roller can be angularly displaced with respect to the first roller so as to selectively adapt the relative position of the rollers for various emulsion speed values.

Other and further objects, features and advantages of the invention will be pointed out hereinafter and appear in the appended claims forming part of the application.

In the accompanying drawings a now preferred embodiment of the invention is shown by way of illustration and not by way of limitation.

Figure 2:
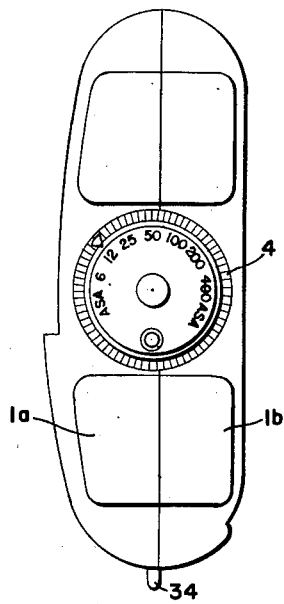
Figure 3:
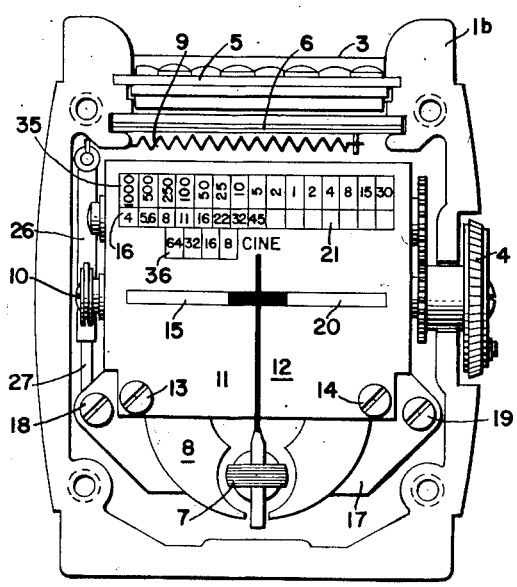
Figure 4:
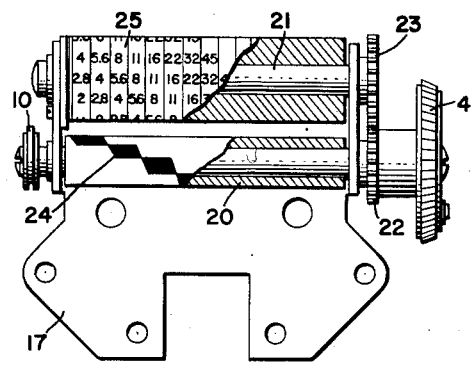
Figure 6:
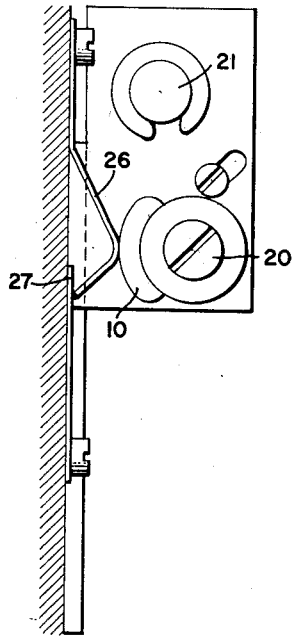
Figure 7:
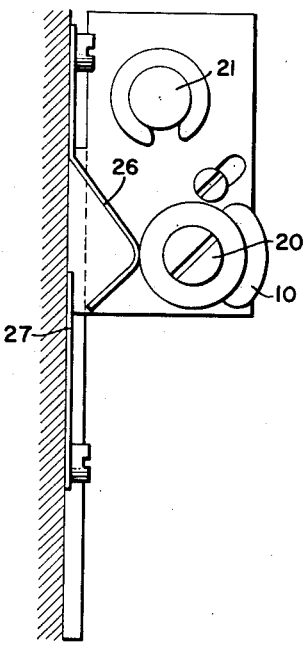
Figure 5:
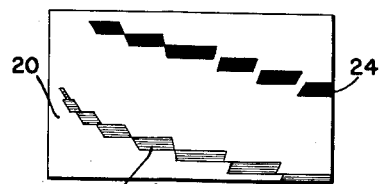
Figure 8:
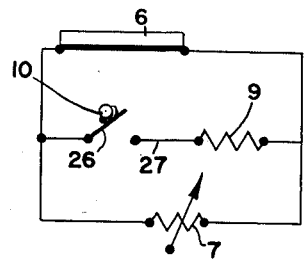
Figure 9:
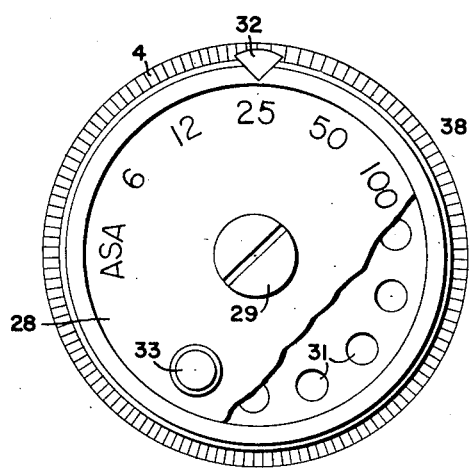
Figure 10:
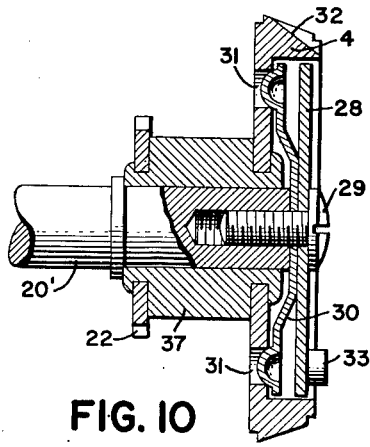

Figure 1 is a side elevation of an exposure meter having the invention applied thereto, Fig. 2 is an end elevation thereof, Fig. 3 is a view similar to Fig. 1 with the upper half of the casing removed to show the internal structure, Fig. 4 is a plan view of the detail, Fig. 5 is a development of the superficies of one of the rollers of the evaluating mechanism, Figs. 6 and 7 are side views of a detail, showing the parts in two different positions, Fig. 8 is a wiring diagram, Fig. 9 is a side view showing the adjusting knob, and Fig. 10 is an axial sectional view of the adjusting knob of Fig. 9.

Figs. 1 and 2 show the side and end views of the apparatus wherein the housing or outer casing is composed of two parts 1a and 1b in which on the upper surface, that is on the part 1a, a glass plate is provided to close the opening 2 through which the scales may be observed. On the upper top surface or side there is an opening to permit the entry of light as indicated at 3 and this cooperates with a photo-electric cell 6. At one side of the device there is a manual rotary button 4 for the purpose of operating both of the cylindrical rollers in the device as will be hereinafter described with reference to Figs. 9 and 10. An eyelet 34 is provided on the casing, preferably at the bottom thereof, to which a carrying chain or strap may be secured.

Fig. 3 shows the various parts of the structure with the outer casing parts removed. It will be seen that the light opening 3 is provided with a lens support 5 to limit the angle of the light picture to be admitted into the apparatus. Below the lens support 5 there is provided the photoelectric element 6, and this is connected with a rotary coil 7 which is movably mounted between the pole shoes of the magnet 8. A resistance element 9 can be connected parallel to the photo-electric element 6, by a switch member 10. An indicator or pointer 11 is secured to the rotary coil 7 and ranges over a scale plate 12, which is secured to the housing part 1b by means of screws 13 and 14. The scale plate 12 is provided with two slots or slits 15 and 16 to exhibit a part of the superficies of rollers 20 and 21 which are rotatably mounted under these slots. Above and below the slot 16 there are scales bearing figures which represent setting values for the camera as will be hereinafter described.

Below the scale plate 12 there is mounted a base plate 17 which is likewise secured to the housing part 1b by means of screws 18 and 19. This mounting plate 17 is separately shown in Fig. 4 of the drawings; the rolls or cylinders 20 and 21 are rotatably mounted on this plate and positively coupled with each other by means of gears 22 and 23, a manual operating knob 4 serving to rotate the rollers. The roll 20 is provided with steplike marks 24 and 24' as shown in Fig. 5. For instance, the marks 24 may be printed in black color and the marks 24' in red color. The roll 21 in turn is provided with axially directed rows of figures 25 representing aperture numbers which can be read off through the slot 16 in scale plate 12. Another row of figures 35, representing exposure times, is provided on the upper longitudinal edge of slot 16 and a still further row of figures 36, representing film speeds (frames per second) is provided on the lower longitudinal edge of slot 16.

The end of the shaft 20' of roll 20 facing away from the knob 4 bears a cam 10 cooperating with a bent contact spring 26 which is adapted to make and break contact with a metal strip 27 (Figs. 6 and 7), whereby a resistance 9 can be connected across the photoelectric cell in order to change the measuring range of the measuring instrument 7, Fig. 8, connected to the cell 6. The relative positions of the cam 10 and of the rows of staggered marks 24 and 24', Fig. 5, are such that the resistance 9 is connected, for instance, with all positions of roll 20 where one of the black marks 24 is exhibited through slot 16 while it is disconnected with all positions of roll 20 where one of the red marks 24' is exhibited.

Referring to Figs. 9 and 10, it will be seen that the knob 4, which is knurled at its conically bevelled periphery, is rotatably mounted on the forward end of the shaft 20' of roll 20, by means of a sleeve 37 to which it is fixedly secured. A disc 28 is fixedly secured to the shaft 20', by means of a screw 29, and loosely seated within a circular depression of knob 4, a flat spring 30 being inserted between, and secured to, members 20 and 28 for coaction with holes 31 provided in the disk portion of knob 4 with such a pitch that any of the figures 38 provided near the periphery of disk 28 and representing sensitivity values of the photographic emulsion (DIN or ASA values) can be placed against the marker 32 by rotating the disk 28 with respect to knob 4, through a stud 33 on disc 28. As a result, the gear wheel 22 which is fixedly connected or formed integral with sleeve 37 and knob 4 is rotatively displaced through a corresponding angle with respect to shaft 20', whereby the relative position of the rolls 20 and 21 is changed accordingly and the coordination between marks 24 or 24' visible under slot 15 and rows 25 visible under slot 16 is changed.

The operation of the exposure meter will now be described by way of a practical example as follows: It may be assumed that an open landscape is to be photographed in full sunlight. At first the sensitivity of the film is adjusted by holding the rim of the wheel or knob 4 and turning the dial 28 by means of the button or stud 33, so that the DIN or ASA value of the film is placed against the marker 32. Let it be assumed that an adjustment to 15/10° DIN or 25 ASA has been chosen as indicated in Fig. 9. Now the shutter of the exposure meter is opened and the meter is pointed at the scene from the position of the camera, in case of a measurement by the reflected light method. The pointer 11 will now be deflected by a certain angle. The roll 20 is rotated by knob 4 until one of the sections or marks 24 or 24' on roller 20 appears underneath the needle or pointer 11. As a result, the roller 21 will also be rotated through an angle corresponding to the rotation of roller 20 and the row of stop values or aperture numbers beginning with 4 on the left hand side and ending with 45 on the right hand end may appear in the inspection slot 16. Since the upper stationary row of figures represents the exposure times which may be combined with the said aperture numbers, it is now possible without further pointing the meter at the scene, to evaluate the measurement and to choose the desired combination of aperture number and exposure time, say stop 16 and 1/50 second or stop 11 and 1/100 second. In case of "cine" photography, the aperture number is read over the chosen film speed (frames per second). For instance, if a film speed of 16 frames per second is chosen, the aperture number will be an intermediate value between 16 and 22. If a reading thus happens to fall between two apertures, the exact position should be repeated on the camera lens.

Normally, black figures will appear in the view slot 16 when black marks have been adjusted in the view slot 15 and red figures will appear when red marks have been adjusted. However, at some positions, black and red figures may appear in slot 16 and in this case the figures corresponding to the color of the mark in slot 15 will apply.

It is believed that the many advantages of a device constructed in accordance with the invention will be readily understood, and although the preferred embodiment of the invention is as illustrated and described, it is to be understood that changes in the details of construction and operation may be had which will fall within the spirit and scope of the invention.

We claim as our invention:

1. An exposure meter comprising a casing, a photoelectric cell and a measuring instrument within said casing, said instrument being connected to said cell and including a pointer whose movements are a non-linear function of the magnitude of the light sensed by the photoelectric cell, two rotary rollers, a fixed plate with two view slots overlying the respective rollers, in an axial direction thereof, means for manually rotating one of said rollers, and gear means between the rollers whereby rotation of one of them is imparted to the other, one of said rollers extending across the range of movement of the pointer and having on its superficies at least one series of staggered marks adapted to be successively exhibited in the respective view slot in such a way that only one of said marks when exhibited in the view slot will coincide with the actual position of the pointer, and the other of said rollers bearing a plurality of axially directed rows of first setting values for the camera adapted to be successively exhibited in the respective view slot and being related to at least one stationary row of figures representing corresponding setting values for the camera provided along at least one of the longitudinal edges of said slot to enable selection of the suitable pair of first and second setting values, said marks and said rows of first setting values being correlated in such a manner that the proper row of first setting values corresponding to the magnitude of the light sensed will be exhibited in the respective slot if the position of the pointer coincides with the exhibited mark.

2. An exposure meter comprising a casing, a photoelectric cell and a measuring instrument within said casing, said instrument being connected to said cell and including a pointer whose movements are a non-linear function of the magnitude of the light sensed by the photoelectric cell, two rotary rollers, a fixed plate with two view slots overlying the respective rollers, in an axial direction thereof, means for manually rotating one of said rollers, and gear means between the rollers whereby rotation of one of them is imparted to the other, one of said rollers extending across the range of movement of the pointer and having on its superficies at least one series of staggered marks adapted to be successively exhibited in the respective view slot in such a way that only one of said marks when exhibited in the view slot will coincide with the actual position of the pointer, and the other of said rollers bearing a plurality of axially directed rows of aperture numbers adapted to be successively exhibited in the respective view slot and being related to at least one stationary row of figures representing corresponding exposure times provided along at least one of the longitudinal edges of said slot to enable selection of the suitable pair of aperture numbers and exposure times, said marks and said rows of aperture numbers being correlated in such a manner that the proper row of aperture numbers corresponding to the magnitude of the light sensed will be exhibited in the respective slot if the position of the pointer coincides with the exhibited mark.

3. An exposure meter comprising a casing, a photoelectric cell and a measuring instrument within said casing, said instrument being connected to said cell and including a pointer whose movements are a non-linear function of the magnitude of the light sensed by the photoelectric cell, two rotary rollers, a fixed plate with two view slots overlying the respective rollers, in an axial direction thereof, means for manually rotating one of said rollers, and gear means between the rollers whereby rotation of one of them is imparted to the other, one of said rollers extending across the range of movement of the pointer and having on its superficies two visibly distinguished series of staggered marks which are adapted to be successively exhibited in the respective slot in such a way that only one of said marks when exhibited in the view slot will coincide with the actual position of the pointer, means for automatically changing the measuring range of the measuring instrument according as one of the marks of the first row or one of the marks of the second row is exhibited in the respective view slot, and the other of said rollers bearing a plurality of axially directed rows of aperture numbers adapted to be successively exhibited in the respective view slot and being related to at least one stationary row of figures representing corresponding exposure times provided along at least one of the longitudinal edges of said slot to enable selection of the suitable pair of aperture numbers and exposure times, said marks and said rows of aperture numbers being correlated in such a manner that the proper row of aperture numbers corresponding to the magnitude of the light sensed will be exhibited in the respective slot if the position of the pointer coincides with the exhibited mark.

4. An exposure meter comprising a casing, a photoelectric cell and a measuring instrument within said casing, said instrument being connected to said cell and including a pointer whose movements are a non-linear function of the magnitude of the light sensed by the photoelectric cell, two rotary rollers, a fixed plate with two view slots overlying the respective rollers, in an axial direction thereof, a knob for manually rotating the first of said rollers, gear means between the rollers whereby rotation of the first roller is imparted to the second roller, emulsion speed adjusting means on said knob whereby the gear means of the first roller can be angularly displaced with respect to said first roller so as to selectively adjust the relative position of the rollers for various emulsion speed values marked on said emulsion speed adjusting means, one of said rollers extending across the range of movement of the pointer and having on its superficies at least one series of staggered marks adapted to be successively exhibited in the respective view slot in such a way that only one of said marks when exhibited in the view slot will coincide with the actual position of the pointer, and the other of said rollers bearing a plurality of axially directed rows of aperture numbers adapted to be successively exhibited in the respective view slot and being related to at least one stationary row of figures representing corresponding exposure times provided along at least one of the longitudinal edges of said slot to enable selection of the suitable pair of aperture numbers and exposure times, said marks and said rows of aperture numbers being correlated in such a manner that the proper row of aperture numbers corresponding to the magnitude of the light sensed will be exhibited in the respective slot if the position of the pointer coincides with the exhibited mark.

References Cited in the file of this patent

UNITED STATES PATENTS

| Number | Name | Date |
|---|---|---|
| 2,203,209 | Weston | June 4, 1940 |
| 2,247,763 | Meyers | July 1, 1941 |
| 2,421,504 | Hickok | June 3, 1947 |
| 2,529,337 | Hickok | Nov. 7, 1950 |